United States Patent [19]

Harrison

[11] 3,871,454

[45] Mar. 18, 1975

[54] WATER FLOOD PROCESS IN CLAY-BEARING SUBSURFACE FORMATIONS

[76] Inventor: William M. Harrison, 364 Chevy Chase, Houston, Tex. 77478

[22] Filed: May 3, 1973

(Under Rule 47)

[21] Appl. No.: 356,829

Related U.S. Application Data

[63] Continuation-in-part of Ser. No. 100,363, Dec. 21, 1970, abandoned.

[52] U.S. Cl. .............................. 166/275, 166/271
[51] Int. Cl. ............................................. E21b 43/22
[58] Field of Search ........................... 166/273–275, 166/305 R, 268, 271, 307, 308; 252/8.55 D

[56] References Cited
UNITED STATES PATENTS

| | | | |
|---|---|---|---|
| 2,761,839 | 9/1956 | Brown et al. .................... | 252/8.55 |
| 2,779,418 | 1/1957 | Garst ............................ | 252/8.55 X |
| 2,800,962 | 7/1957 | Garst ............................ | 252/8.55 X |
| 2,839,466 | 6/1958 | Shock et al. ................... | 252/8.55 X |
| 3,024,159 | 3/1962 | Bollenback et al. ............ | 252/8.55 X |
| 3,373,810 | 3/1968 | Williams ........................ | 166/246 |
| 3,431,265 | 3/1969 | Wakeman ...................... | 252/8.55 X |

*Primary Examiner*—Stephen J. Novosad

[57] ABSTRACT

A material and process for improving the secondary recovery of oil from clay-bearing, oil-producing subterranean formations is disclosed. The addition of sulfonated carbohydrates, especially sugars, with water flood operations prevents surfactant loss and the swelling and degradation of clay in underground clay-bearing formations.

5 Claims, No Drawings

WATER FLOOD PROCESS IN CLAY-BEARING SUBSURFACE FORMATIONS

CROSS-REFERENCE TO PENDING APPLICATIONS

This application is a continuation-in-part of my copending application Ser. No. 100,363 filed Dec. 21, 1970, now abandoned.

BACKGROUND OF THE INVENTION

In the production of oil from oil-producing formations it often becomes necessary to resort to secondary recovery methods such as water flood to obtain additional oil from the oil-containing subterranean formation. When the formation contains clays such as bentonite and montmorillonite, problems often occur since clays of this nature swell and deteriorate causing plugging in the formation, particularly around the bore hole where water flood material is introduced into the formation.

In the past, a number of materials have been used as sacrificial materials to plate or coat the clays and protect them from the degradation caused by contact with water and caustic which is often used in the water flood material. A surface active agent is often included with the water in secondary production and well treatment, as described in U.S. Pat. No. 2,800,962. When such surfactants are used, they often adhere to the clay surfaces and build up a plurality of layers, thus being effectively removed from the water flood material and lost, causing an economic disadvantage requiring more surfactant to be added to the subsurface formation than would be necessary. Methods for using surfactants for increasing production of an oil well are well-known. One such method is described in U.S. Pat. No. 2,779,418, for example.

Clays of the bentonitic type have layered structures which are often attacked by the caustic and caused to be deteriorated and broken apart. These clays must be coated with a suitable material to prevent the contact and degradation. The coating material must be such as to coat the outside oxide layers of the clay platelets, as well as to coat the edges of the platelets where metal hydroxides are exposed. Other materials which contact the clays and cause deterioration include naphthenic acids, asphaltic acids, and anionic materials in general, of crude oils, these reacting with the metal hydroxide layers of the clays to form invert emulsions with the crude oils.

Previously, sugars have been used as sacrificial materials for nonionic surfactants to coat, or plate, on clay and sand particles by hydrogen bonding to the oxide surfaces. However, since the —OH group is nonpolar, the sugars tend to layer up on the oxide surfaces. That is, a first layer of sugar is coated, or plated, on the oxide layer at the surface of the clay, then, since the —OH group or groups of the sugar layer are nonpolar, another layer will plate on the first, then still another layer, and so on, so that any number of layers may become plated over the clay surface. Since a single layer is all that is necessary to protect the clay, the additional layers are wasted with regard to their intended purpose, so that an excess of plating material is consumed. Furthermore, the sugars alone do not effectively plate or coat the edges of the clay platelets, so that complete protection of the clays is not obtained. In fact, the protection fails at the edge surfaces where protection is most needed, where the naphthenic acids and asphaltic acids of crude oil tend to form invert emulsions with the hydrated metal oxides (or hydroxides) of the inner clay layers, when the pH is 8.5 or greater.

Further, when the clay is not coated with a sacrificial material, surfactant adheres to the clay in multiple layers and the effectiveness of the water flood is often diminished, if not lost altogether.

Accordingly, it is the object of this invention to provide a sacrificial material to be incorporated with water flood material to protect clays in the subterranean formation against deterioration, disintegration and swelling when placed in contact with materials in the well which react therewith, for example, caustic, naphthenic acids and asphaltic acids.

It is a further object of this invention to provide a sacrificial material which will prevent the adhering of surfactants used in water flood processes from becoming attached to clays present in oil bearing formations.

SUMMARY OF THE INVENTION

This invention relates to an improved process for water flood operations which comprises incorporating into the water flood composition an effective amount, not exceeding 0.1 percent by volume, of a sulfonated carbohydrate such as the sugars and starches, for example. These sulfonated carbohydrates have a plurality of —OH groups. In sugars, for instance, some of the —OH groups are located on intermediate carbon atoms of the carbon chain and others of the —OH groups are located terminally. For example, the structural formula of sucrose may be represented by:

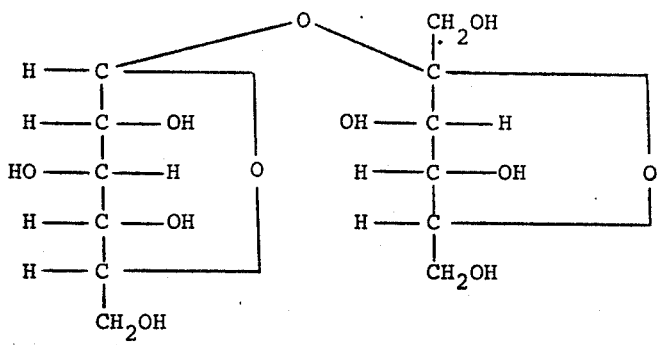

The ether oxygen sulfonates most readily. Further sulfonation is not necessary for the practice of my invention. Hydration of the sugar first occurs, forming aldehydes, following which sulfonation is completed, according to well-known processes. The process for the sulfonation of carbohydrates, such as sugars and starches, is well-known to those skilled in the art.

These sulfonated carbohydrate sacrificial materials, when incorporated into the water flood, either in the presence of caustic or surfactants, form a protective layer on the clays in the subsurface formation which allows the water and surfactant to pass, preventing blockage of the formation due to the swelling or disintegration of the clays, particularly the bentonitic type of clay.

DESCRIPTION OF THE PREFERRED EMBODIMENT

In the practice of my invention, suitable carbohydrates, including the well-known starches and sugars are sulfonated and added to water flooding materials in an amount effective to coat the clay in the formation but not exceeding about 0.1 percent by volume. The materials are pumped into the well and ultimately the oil-bearing, clay containing formation. The suitable starches and sugars are well-known and include, for example, amylose, sucrose, glucose. In general, any of the mono-, di-, or tri-saccharides can be sulfonated and used in the practice of my invention.

Long chain sulfoalkylated poly(glucosylglucan) materials have been used as thickeners for water in water flood operations but such a thickener used in clay-containing, oil-producing formations would cause a blockage of the formation similar to that caused if water or water with caustic were used. In the practice of my invention, the carbohydrates sulfonated are, at most, low molecular weight trisaccharides.

Clays of the bentonitic type have layered structures. The outer surface layer is an oxide layer, principally hydrated silicon dioxide, $SiO_2$. The inner layers are hydrated metal hydroxides, principally aluminum oxide, iron oxide and magnesium oxide. The clay formed hydrates, water entering between the layers to cause swelling of the clays. In the bentonitic type clays such swelling is often up to 31 percent of its original size. According to the practice of my invention, I have discovered that sulfonated forms of carbohydrates, such as sugars and starches, particularly the monomeric form, are useful in protecting or coating these platelets of bentonitic clay to prevent such swelling and disintegration. The sulfonated compounds are not nonpolar, as are the sugars, and the like, but instead are polar, so that after the first layer thereof is plated to the clay surfaces, the edge surfaces being plated as well as the side surfaces, the first layer repels additional sulfonated compound so that additional layers do not form and the clay surfaces are protected with a minimum of sacrificial material, with consequent high efficiency and economy of usage of the sacrificial material.

When bentonitic clays are treated with caustic, NaOH, the pH of the mixture continues to fall, showing that the caustic is reacting with the clays and being expended, and the clay platelets continuously disintegrate. When the clays are treated with sugars in the water flood solution, followed by treatment with caustic, the pH of the mixture falls at a much slower rate, but with eventual disintegration of the clay platelets. However, when the clays are treated with effective amounts not exceeding about 0.1 percent by volume of the sulfonated sugars in the water flood solution, followed by treatment with caustic, and initial slight drop in pH occurs but stops and no further drop in pH occurs, even on very long standing. No disintegration or flocculation of the clays occurred, showing that the sulfonated sugar fully protected the clays, and even though only a small amount of the sulfonated sugar was used for plating, the protection was substantially complete.

Water flood operations employ a number of ingredients and variations. Water flood operations and components used are described in U.S. Pat. Nos. 3,373,810; 2,839,466; 2,779,418 and 2,800,962, for example. These patents describe other ingredients in water flood materials useful in the process of my invention.

The presence of clay in the oil-bearing formation can be determined easily by well-known methods of taking a core sample and analyzing said sample for the clay. The per cent of clay present in the oil-bearing subterranean formation can be readily determined by X-ray diffraction analysis of the core and where the clay content is 5 percent or greater, the practice of my invention is applicable. I have discovered that, regardless of the amount of clay content of the subterranean formation, not more than about 0.1 percent by volume, with respect to the water injected into the bore hole is necessary. The effective amount of sulfonated carbohydrate to use can also be determined by simple laboratory experimentation utilizing core samples from the oil-producing formation. Data produced in this manner provide empirical basis for determining the minimum effective amount.

In the secondary recovery of oil from a subsurface oil-producing formation, water containing a suitable surfactant for water flood is pumped through the bore hole into the oil-producing formation. After pumping but a short period of time, the pressure at the wellhead on the exit side of the pump increases dramatically, indicating that obstructions within the clay-containing, oil-producing formation are building up. Conversely, in a similar situation where water flood operation is carried out in the subterranean, clay-containing, oil-producing formation, less than 0.1 percent by volume of sulfonated sugar is added to the water pumped through the bore hole into the formation. No significant rise in pressure results and the water flood operation is successfully accomplished.

By the foregoing comparisons, it is shown that while unsulfonated sugars or the like are effective for protection of clays, it has been found that sulfonates of sugars are suprisingly effective where the oil-bearing formation contains clay.

Sulfonated sugars and the like are available for use in connection with the invention as waste products from wood pulp and paper industries. These materials contain any number of sulfonated compounds, all of which are useful in the practice of the invention, either in mixtures or as pure substances.

While the preferred embodiments of the invention have been described, many modifications thereof will be apparent to those skilled in the art and it is intended that any such modifications of the invention are within the scope of the following claims.

I claim:

1. In the method for improving the production of oil from an oil-producing formation containing bentonitic clays by injecting water flood materials into a bore hole connecting the oil-bearing formation with the surface of the earth, the improvement which comprises, injecting the water flood material containing an effective amount to prevent swelling and disintegration of clay in the formation but not more than about 0.1 percent by volume, with respect to water in the water flood material, of a sulfonated carbohydrate.

2. The method according to claim 1 wherein the sulfonated carbohydrate is a sulfonated sugar or starch.

3. The method according to claim 2 wherein the sulfonated material is a mono-, di-, or tri-saccharide sugar.

4. An improved water flood process for recovering oil from oil-bearing formations containing clay which comprises, injecting into said formation through a bore hole, a water flood material containing water and an effective amount to prevent swelling and disintegration of clay in the formation up to not more than about 0.1 percent by volume, with respect to said water of a sulfonated carbohydrate and withdrawing oil from the formation through a well.

5. The water flood process of claim 4 wherein the water flood material contains a surfactant suitable for well treating.

* * * * *